(12) United States Patent
Engbers et al.

(10) Patent No.: US 9,374,441 B2
(45) Date of Patent: Jun. 21, 2016

(54) DYNAMICALLY DETERMINING AND UTILIZING AN APPLICATION PROGRAMMING INTERFACE OF AN ELECTRONIC DEVICE

(75) Inventors: Dennis Engbers, Losser (NL); Peter Hillen, Hengelo (NL); Menno de Jong, Enschede (NL); Riemer Andries van Rozen, Almelo (NL); Harmen Henrie Karel Bekedam, Enschede (NL)

(73) Assignee: EchoStar Technologies L.L.C., Englewood, CO (US)

( * ) Notice: Subject to any disclaimer, the term of this patent is extended or adjusted under 35 U.S.C. 154(b) by 627 days.

(21) Appl. No.: 12/901,210

(22) Filed: Oct. 8, 2010

(65) Prior Publication Data

US 2011/0107346 A1  May 5, 2011

Related U.S. Application Data

(60) Provisional application No. 61/250,396, filed on Oct. 9, 2009.

(51) Int. Cl.
| | | |
|---|---|---|
| G06F 13/00 | (2006.01) |
| H04L 29/08 | (2006.01) |
| G06F 9/54 | (2006.01) |
| G06F 9/46 | (2006.01) |
| H04N 21/443 | (2011.01) |

(52) U.S. Cl.
CPC ............ *H04L 67/34* (2013.01); *G06F 9/465* (2013.01); *G06F 9/541* (2013.01); *H04L 67/025* (2013.01); *H04N 21/4431* (2013.01); *H04N 21/4433* (2013.01)

(58) Field of Classification Search
None
See application file for complete search history.

(56) References Cited

U.S. PATENT DOCUMENTS

| | | | | |
|---|---|---|---|---|
| 5,778,182 A | * | 7/1998 | Cathey et al. | 709/219 |
| 6,915,528 B1 | * | 7/2005 | McKenna, Jr. | 725/37 |
| 6,990,677 B1 | * | 1/2006 | Pietraszak et al. | 725/49 |
| 7,228,560 B2 | * | 6/2007 | Panabaker | 725/114 |
| 8,702,504 B1 | * | 4/2014 | Hughes et al. | 463/31 |
| 8,934,758 B2 | * | 1/2015 | Meijer | 386/249 |
| 8,990,847 B2 | * | 3/2015 | Aldrey et al. | 725/32 |
| 2002/0042831 A1 | * | 4/2002 | Capone et al. | 709/230 |
| 2002/0120940 A1 | * | 8/2002 | Willard | 725/91 |
| 2004/0210933 A1 | * | 10/2004 | Dresti | G08C 17/00 725/40 |
| 2005/0155075 A1 | * | 7/2005 | Crichton | 725/105 |
| 2005/0262145 A1 | * | 11/2005 | Kawano | 707/104.1 |
| 2008/0010664 A1 | * | 1/2008 | Pelizza et al. | 725/134 |
| 2009/0228919 A1 | * | 9/2009 | Zott | H04N 7/17318 725/34 |

* cited by examiner

*Primary Examiner* — H S Sough
*Assistant Examiner* — Phuong N Hoang
(74) *Attorney, Agent, or Firm* — Kilpatrick Townsend & Stockton LLP (57) ABSTRACT

A method of dynamically determining and utilizing an application programming interface within an electronic device is presented. In the method, a definition of an object is received from the application programming interface, wherein the definition describes at least a portion of the application programming interface. The object is then generated based on the definition, wherein the object includes data for controlling the electronic device. The object is transferred to the application programming interface.

18 Claims, 7 Drawing Sheets

DYNAMICALLY DETERMINING AND UTILIZING AN APPLICATION PROGRAMMING INTERFACE OF AN ELECTRONIC DEVICE

RELATED APPLICATIONS

This application claims the benefit of U.S. Provisional Application No. 61/250,396, entitled "Dynamically Determining and Utilizing an Application Programming Interface of an Electronic Device", and filed Oct. 9, 2009, which is hereby incorporated herein by reference in its entirety.

BACKGROUND

Many electronics equipment manufacturers develop and sell embedded electronic devices to a number of equipment providers, each of which may desire to customize the devices according to their own requirements before offering the devices to their own customers. In just one example, a television set-top box manufacturer may develop a set-top box for a number of satellite or cable television service providers. In turn, each of the service providers may then deliver one or more of the set-top boxes to each of their subscribers to allow the subscribers to receive the television programming the service provider supplies. Since some of the service providers may be mutual competitors, each provider likely desires to customize the set-top boxes it provides to distinguish its offerings from those of its competitors.

One prominent area in which a television service provider may customize its set-top boxes is the user interface, which may be the most recognizable characteristic discernable by a subscriber. With respect to a set-top box, the user interface may encompass the various menus and related information presented to a subscriber via a television display, the set of commands available to the subscriber to control the operation of the set-top box (typically by way of a remote control device), and the overall "look-and-feel" of how the user interacts with the set-top box.

In many cases, the set-top box manufacturer maintains complete control over the firmware and software resident in the various set-top boxes it develops. One reason for this control is that the application programming interface (API) between the user interface software and the remainder of the software employed in the set-top box is often complex in nature, and may undergo changes over time as the set-top box design matures. As a result, the manufacturer often develops the initial form of the user interface, and incorporates any subsequent changes thereto, based on requirements provided by the service provider. Thus, the service provider possesses at most indirect control of the user interface, while the manufacturer shoulders the burden of updating the user interface for each separate service provider purchasing the set-top box, as well as for each type or model of set-top box produced.

BRIEF DESCRIPTION OF THE DRAWINGS

Many aspects of the present disclosure may be better understood with reference to the following drawings. The components in the drawings are not necessarily depicted to scale, as emphasis is instead placed upon clear illustration of the principles of the disclosure. Moreover, in the drawings, like reference numerals designate corresponding parts throughout the several views. Also, while several embodiments are described in connection with these drawings, the disclosure is not limited to the embodiments disclosed herein. On the contrary, the intent is to cover all alternatives, modifications, and equivalents.

DETAILED DESCRIPTION

The enclosed drawings and the following description depict specific embodiments of the invention to teach those skilled in the art how to make and use the best mode of the invention. For the purpose of teaching inventive principles, some conventional aspects have been simplified or omitted. Those skilled in the art will appreciate variations of these embodiments that fall within the scope of the invention. Those skilled in the art will also appreciate that the features described below can be combined in various ways to form multiple embodiments of the invention. As a result, the invention is not limited to the specific embodiments described below, but only by the claims and their equivalents.

Figure 1:
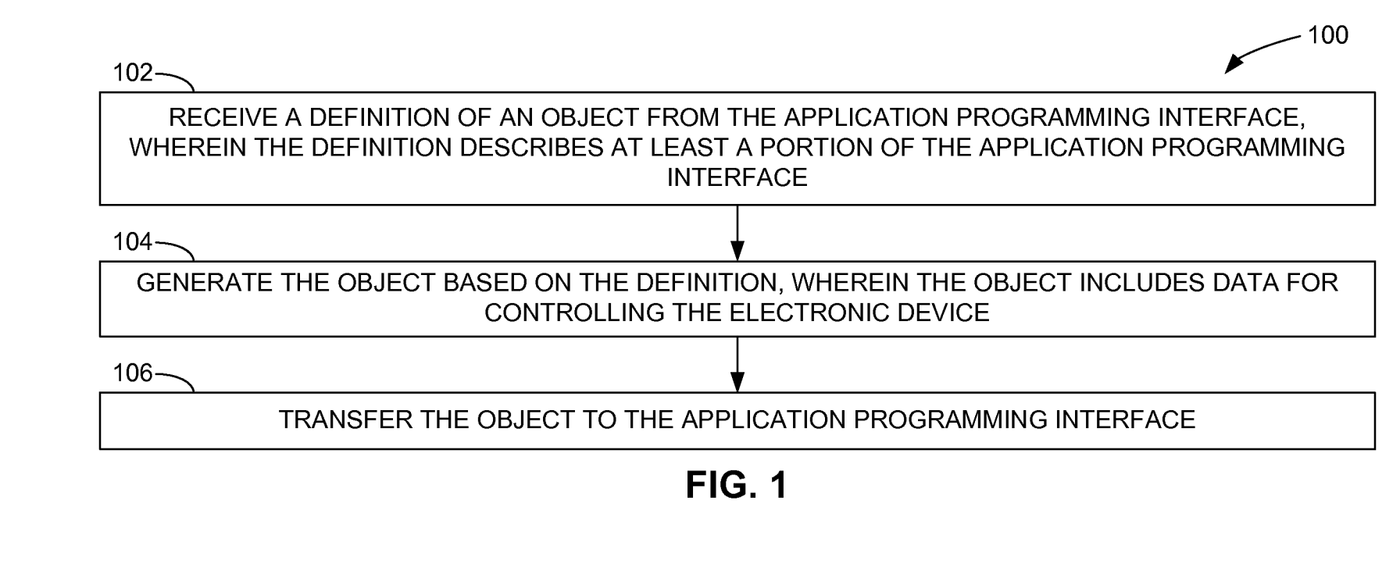
FIG. 1 is a flow diagram of a method according to an embodiment of the invention for determining and utilizing an application programming interface within an electronic device.

FIG. 1 is a flow diagram of a method 100 for dynamically determining and utilizing an application programming interface within an electronic device. In the method 100, a definition of an object is received from the application programming interface, wherein the definition describes at least a portion of the application programming interface (operation 102). The object is then generated based on the definition (operation 104). The object includes data for controlling the electronic device. The object is then transferred to the application programming interface (operation 106). In another embodiment, a computer-readable storage medium of the electronic device may have encoded thereon instructions for at least one processor or similar control circuitry of the electronic device to implement the method 100.

As a result of at least some embodiments of the method 100, the specific requirements and capabilities of the electronic device that are embodied in the application programming interface may be determined at execution time, thus allowing other software applications communicating with the application programming interface to adapt to a particular version of the application programming interface being utilized in the electronic device at that time. Therefore, the software communicating with the application program interface need not be revised, recompiled, and reloaded for each change in the application programming interface. Similarly, since different versions of the electronic device may incorporate at least slightly differing versions of the application programming interface, a single version of the software communicating with the application programming interface may be employed in each of the various versions of the electronic device. Other advantages may be recognized from the various implementations of the invention discussed in greater detail below.

Figure 2:
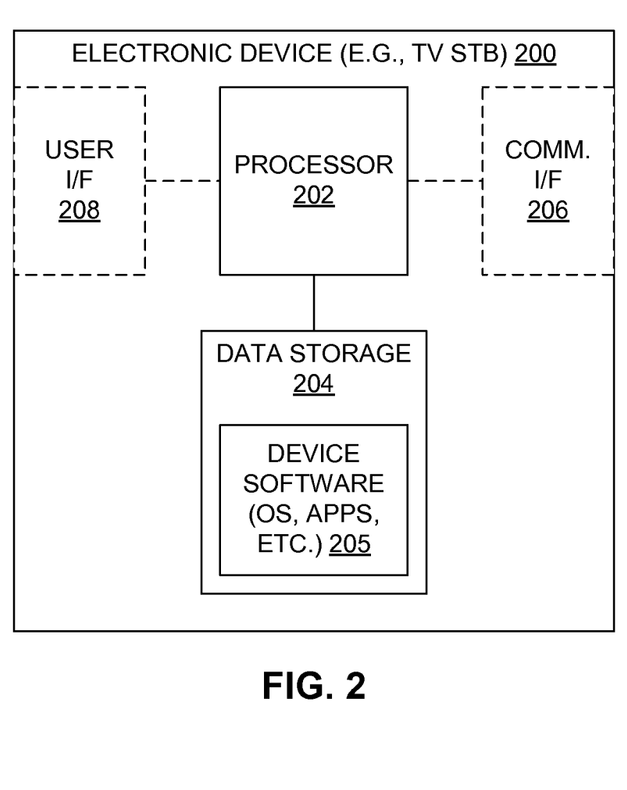
FIG. 2 is a block diagram of an electronic device employed in an embodiment of the invention.

FIG. 2 is a block diagram of an electronic device 200 employed as a hardware platform for one or more software applications according to one embodiment. Generally, the electronic device 200 includes a processor 202 coupled with data storage 204. In some implementations, the electronic device 200 may also include one or both of a communication interface 206 and a user interface 208. Other components, such as a power supply, may also be included in the electronic device 200, but such components are not explicitly shown in FIG. 3 nor discussed below to simplify the following discussion.

The processor 202 may be any processor, such as a microprocessor, microcontroller, or similar control circuitry configured to execute software, firmware, and the like (collectively referred to as "software" herein) stored in the data storage 204 to perform one or more functions or operations expected of the device 200.

The data storage 204 may be any data storage capable of storing digital data, including an operating system, one or more software applications, and associated software and static data for the processor 202 to access and execute. The data storage 204 may also store variable data, pointer information, and the like utilized by the processor 202 to execute the software. The data storage 202 may include volatile data storage, such as dynamic random-access memory (DRAM) or static random-access memory (SRAM), nonvolatile data storage, such as flash memory, magnetic disk drives, and optical disk drives, or combinations thereof.

As noted above, the electronic device 200 may further contain the communication interface 206 and the user interface 208 of FIG. 2 in some implementations. The communication interface 206 may be a WAN interface, such as an interface to communicate via the Internet, although other interfaces, such as a LAN interface or a wireless network adapter, may be employed in other arrangements. Specific examples of the communication interface 206 include, but are not limited to, an Ethernet interface, a cable or digital subscriber line (DSL) interface, a Wi-Fi interface, a cellular communication network interface, a wireless infrared or other optical interface, and a wireless radio frequency (RF) interface.

The user interface 208 of the electronic device 200 is configured to receive commands from a user to control the device 200. The user interface 208 may include or be coupled with any number of input and/or output components to allow the user to interact with the electronic device 200, such as a keyboard, keypad, mouse, joystick, touchpad, visual monitor, video display, and/or audio speakers. In some cases, the user interface 208 may incorporate a remote control interface so that the user need not be positioned within reach of the device 200 to provide input thereto.

In specific examples described below, the electronic device 200 is a media content receiver, such as a television set-top box (STB), which may be a satellite, cable, or terrestrial ("over-the-air") set-top box. Typically, the set-top box 200 receives multiple channels of television programming from at least one audio/video source, such as a satellite in geosynchronous orbit, a coaxial cable head-end, or a terrestrial antenna. However, virtually any type of processor-driven electronic device, including embedded special-purpose devices, incorporating software implementing an identifiable application programming interface (API) may serve as the electronic device 200 in other embodiments.

In addition to the components depicted in FIG. 2, the set-top box 200 may also include circuitry typically associated with a set-top box, such as an antenna or cable input to receive the multiple channels of television programming, one or more tuners for selecting one of the channels, and decoding and/or decrypting circuitry and output circuitry for presenting the audio and/or visual aspects of the selected channel to the user. Also, the set-top box 200 may include a digital video recorder (DVR) unit for recording selected channels of programming for subsequent viewing. However, such circuitry is not illustrated in FIG. 2 to simplify and focus the following discussion.

Figure 3:
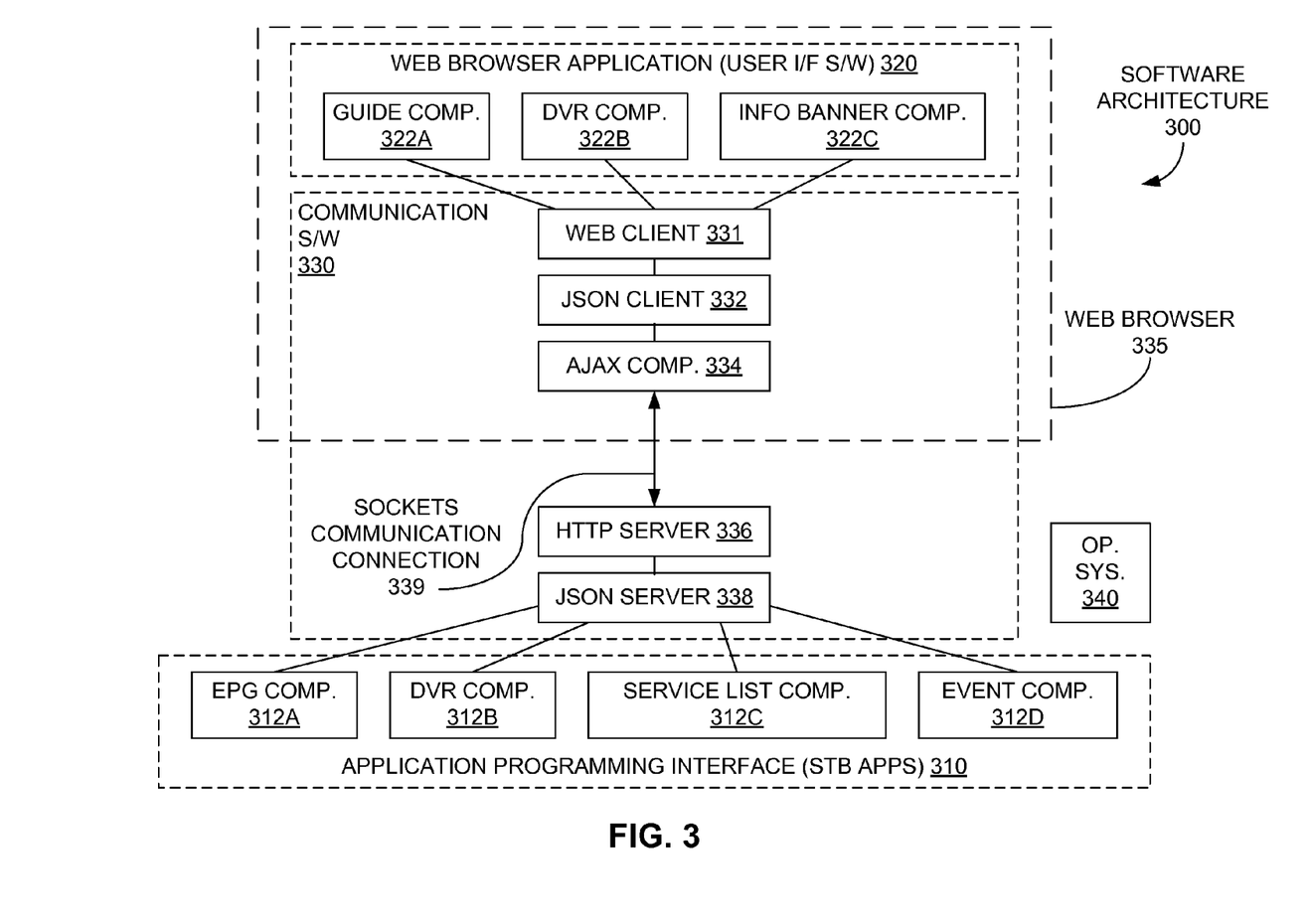
FIG. 3 is an architecture block diagram for software components executed in the electronic device of FIG. 2 according to an embodiment of the invention.

FIG. 3 provides a high-level view of the software architecture 300 implemented in the set-top box 200 of FIG. 2 according to one embodiment. Included in the architecture 300 is an application programming interface (API) 310 for a number of set-top box applications 312 running in the set-top box 200. In this specific example, the applications 312 associated with the API 310 include an electronic program guide (EPG) component 312A, a DVR component 312B, a service list component 312C, and an event component 312D. More, fewer, or other applications 312 not specifically depicted in FIG. 3 may be utilized in conjunction with the API 310 in other implementations. The execution of the components 312 is controlled primarily by an operating system 340, such as Linux, Windows®, or another general-purpose or real-time operating system.

More specifically, the EPG application 312A may receive electronic program guide (EPG) information, such as the identity of programs and the particular channel and time at which they may be viewed, and provide access to that information. The DVR application 312B may handle any recording and/or retrieval of programs facilitated by a DVR incorporated in the set-top box 200. The service list component 312C may maintain information on one or more services that may be provided or performed by the set-top box 200. Finally, the event component 312D may detect and transfer events generated within the set-top box 200 that require some level of attention or processing.

Also included in the software architecture 320 are user interface software applications or components 322 to be used in conjunction with the user interface 208 of the set-top box 200. As shown, the applications or components 322 include a guide component 322A for accessing and presenting the electronic program guide (EPG) of the set-top box 200 to the user, a DVR component 322B for allowing the user to control the DVR included in the set-top box 200, and an information banner component 322C for presenting information, such as the current channel number and call letters, the title of the program, and so on, to the user over a television coupled with the set-top box 200. Generally, each of these components 322 is required to access one or more of the STB applications 312 via the API 310 to control the operation of the set-top box 200, obtain information concerning programming being received, and perform other tasks.

In the specific embodiment of FIG. 3, the user interface components 322 are implemented as a web browser application 320 operating within a web browser 335. One reason for implementing the user interface components 322 in such a manner is that many browsers available today, such as Internet Explorer, Safari, Firefox, and others, provide support for the use of the JSON (JavaScript Object Notation) and AJAX (Asynchronous JavaScript And XML) standards employed herein, as is discussed in detail below. In some implementations, the browser application 320 is written in JavaScript or Jscript.

Communication software 330 residing between the web browser application 320 and the API 310 facilitates transfer of information therebetween. In the specific example of FIG. 3, the components of the communication software 330 include a web client 331, a JSON client 332, an AJAX component 334, an HTTP (HyperText Transfer Protocol) server 336, and a JSON server 338. Two or more of these components 331-338 may be combined to form a single component in other implementations. Each of these components 331-338 are described in greater detail below.

Generally, each of the STB components or applications 312 responds to commands, returns responses, and performs other duties associated with its area of responsibility via the API 310. Depending on the specific hardware and software capabilities of the particular model of set-top box 200 involved, the details of the API 310, such as the number or type of variables received as input or produced as output, may change for each model of STB 200. To determine the characteristics of the API 310 for a particular set-top box 200, the communication software 330 helps determine specific details of the API 310 at runtime, and thereafter facilitates the use of the API 310 by the user interface software 320.

Figure 4A:
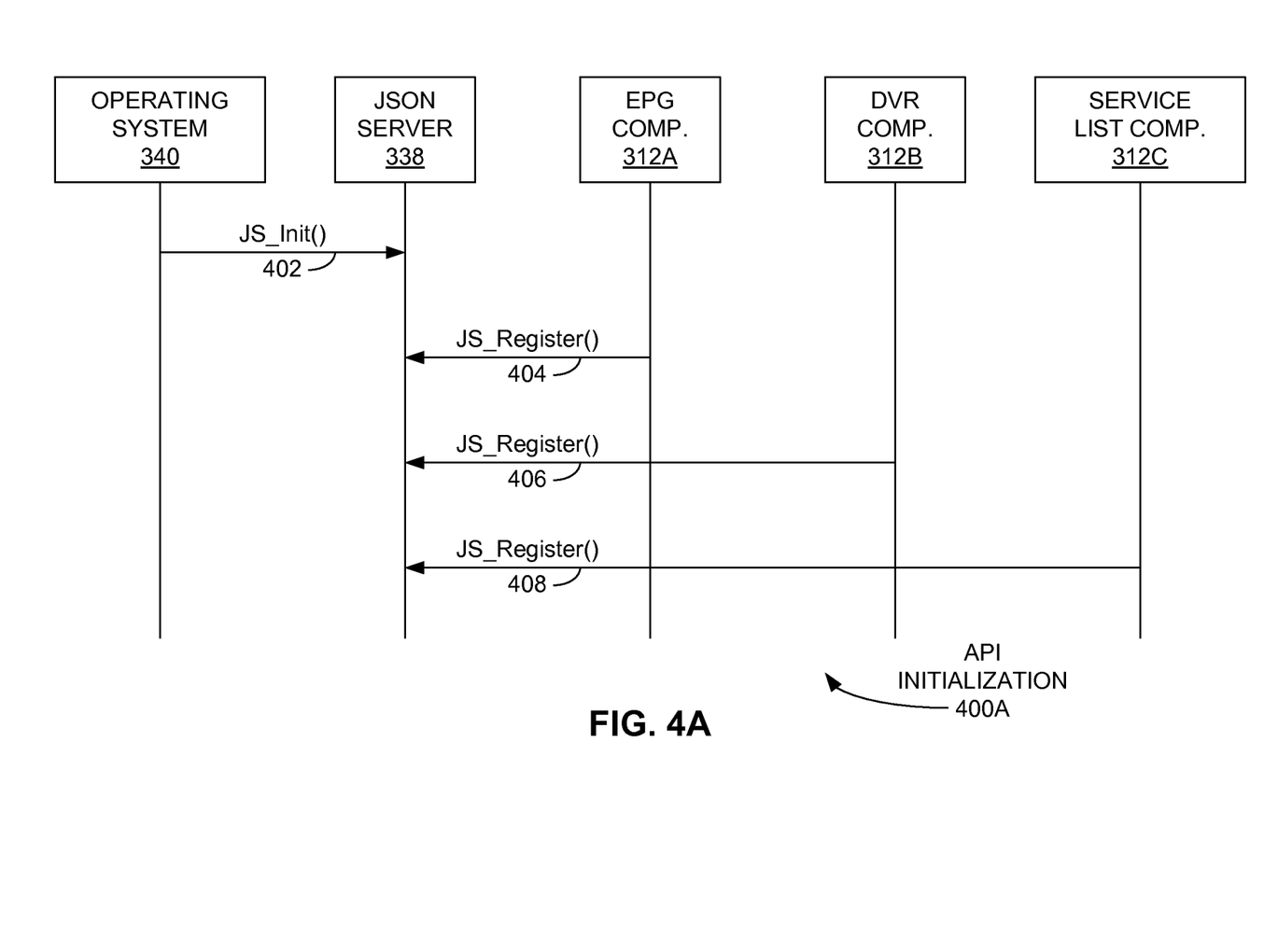
FIG. 4A is a communication diagram involving components of the software architecture of FIG. 3 resulting from initialization of the application programming interface according to an embodiment of the invention.

To this end, as shown in FIG. 4A, the JSON server 338, in response to receiving an initialization command 402 (e.g., by way of a call to a function JS_Init( )), may thereafter receive a definition of one or more software "objects", wherein the definition specifies the API 310 as it pertains to each of the STB applications 310. In some embodiments, this definition may include the identity of various function calls to which the applications answer, message formats, particular types of data employed as input and output, and the like.

As shown in the example of FIG. 4A, this definition is "registered" with the JSON server 338 (e.g., via a call to a function JS_Register( )) by each of the EPG component 312A (operation 404), the DVR component 312B (operation 406), and the service list component 312C (operation 408).

Generally, a software object is a collection of data items, possibly associated with functions or other methods capable of manipulating the data items. In the specific case of the JSON server 338, the received definitions are embodied as one or more JSON "schemas", which are definitions of JSON data structures or objects based on the JSON standardized data format. Essentially, a JSON schema provides a "contract" defining what types and forms of data are required for one of more of the applications 312, in what ways that data may be modified or manipulated, and the like. In other words, the schema "exposes" or defines a particular portion of the API 310 to be used by the browser application 320. As discussed more fully below, the browser application 320 will then employ the resulting objects associated with the schemas received via the communication software 330 to initiate commands and other communications with the set-top box applications 312 via the API 310.

Figure 4B:
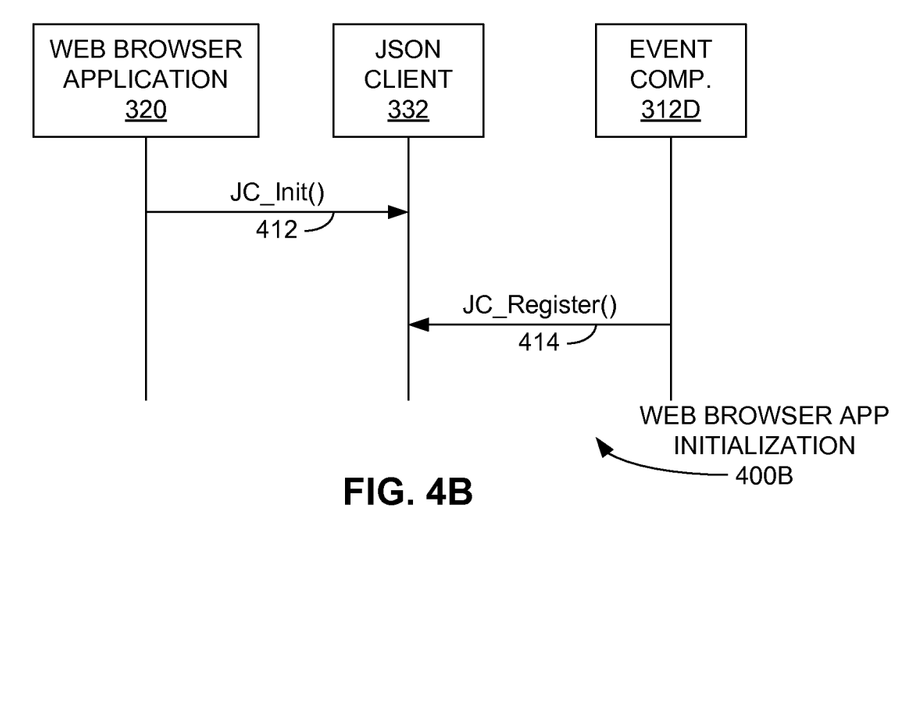
FIG. 4B is a communication diagram involving components of the software architecture of FIG. 3 resulting from initialization of the web browser application according to an embodiment of the invention.

As shown in FIG. 4B, in one embodiment, the JSON client 332 may receive an initialization command 412 from the web browser application 320 (e.g., via a call to a function JC_Init( )). In response, the JSON client 332 may receive a definition or JSON schema of the API 310 as associated with the event component 312D (e.g., by way of a call to a function JC_Register( )) (operation 414). In this case, the JSON client 332 is the recipient of the schema instead of the JSON server 338 since the event application 312D is responsible for initiating a communication with the client 332 via the communications software 330 in response to an event occurring within the set-top box 200.

After receiving the schemas, the JSON client 332 and the JSON server 338 may exchange the schemas therebetween so that the corresponding client/server has access to the schemas defining the API 310. In the illustrated embodiment of FIG. 3, the JSON client 332 and the JSON server 328 perform this exchange or transfer via the AJAX component 334 and the HTTP server 336 depicted therein. Generally, the AJAX component 334 operates as a client-side module allowing asynchronous retrieval of data from the HTTP server 336, typically using the XmlHttpRequest standard for sending HTTP requests directly to the HTTP server 336 from a scripting language, such as JavaScript, as well as loading any response data received back into the scripting language. The AJAX component 134 thus facilitates efficient communications between the JSON client 332 and the JSON server 338. The HTTP server 336 facilitates the transfer of data, such as the JSON objects mentioned above, to and from the API 310 in a manner compatible with the web browser 335.

As is often done in other web communication contexts, communications between the AJAX component 334 and the HTTP server 336 is performed via a sockets connection 339. As is described in the context of other embodiments below, such a connection 339 may facilitate communication between two processes or entities lying within the same electronic device 200, or located in separate electronic devices.

Figure 5:
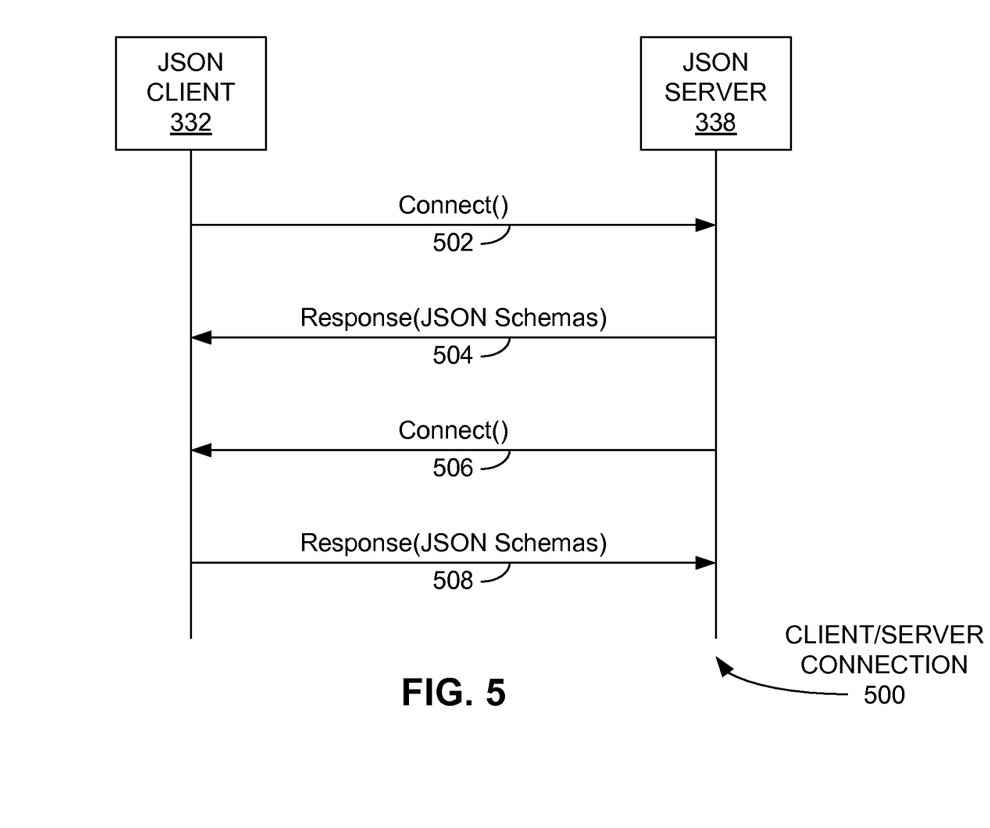
FIG. 5 is a communication diagram involving components of the software architecture of FIG. 3 during client/server connection according to an embodiment of the invention.

As shown in the particular example of FIG. 5, in order to exchange the schemas, the JSON client 332 may request a connection to the JSON server 338 (e.g., via a Connect( ) function call) (operation 502). In response to the connection request 502, the JSON server 338 issues a response (e.g., via a Response( ) function call), returning the JSON schemas it has received to the JSON client 332 (operation 504). Similarly, in one embodiment the JSON client 332 may receive a corresponding connection request 506 (via a call to the Connect( ) function), and respond (via a Response( ) function call) by returning schemas it has received.

Figure 6:
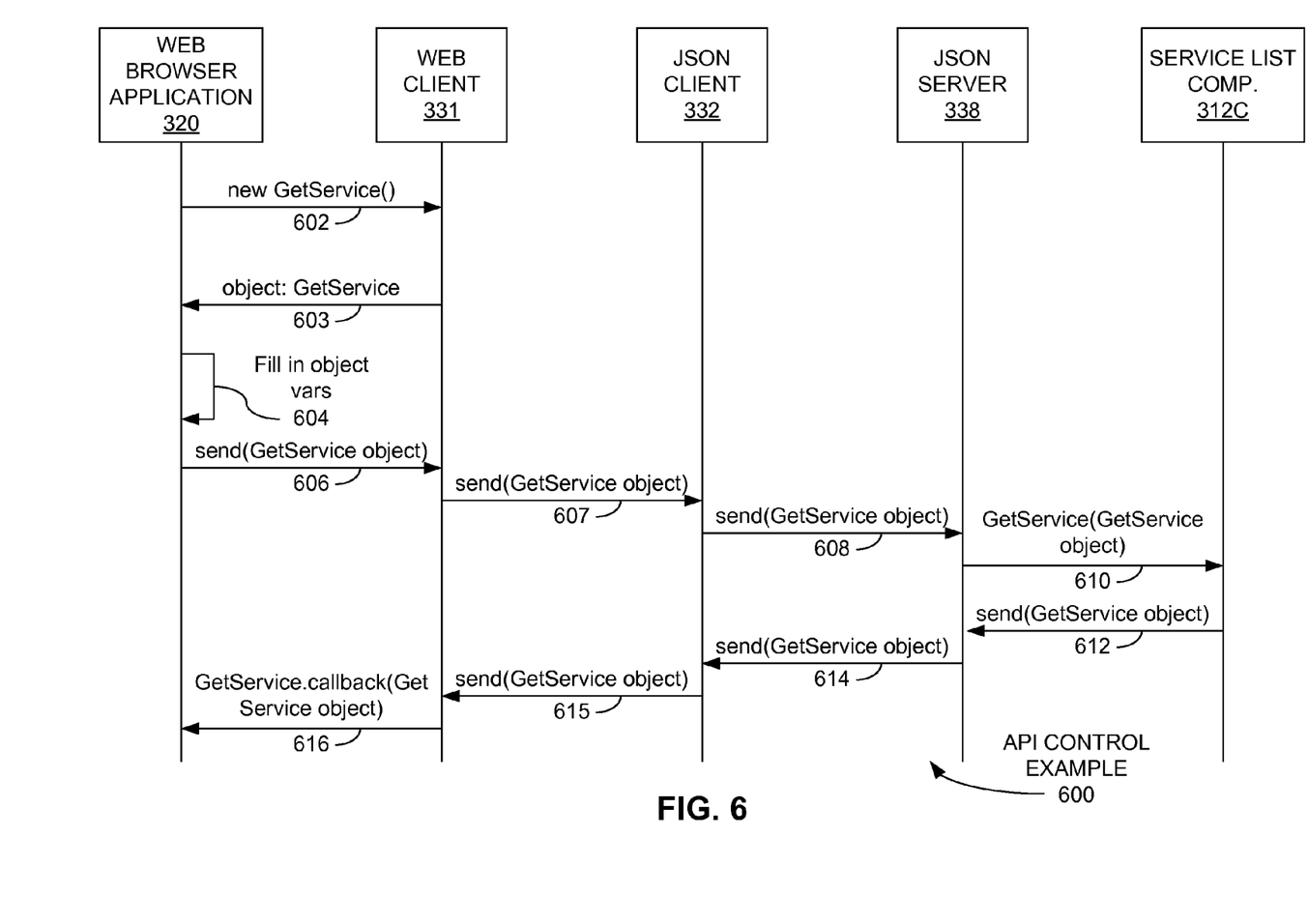
FIG. 6 is a communication diagram involving components of the software architecture of FIG. 3 during a control operation involving the application programming interface according to an embodiment of the invention.

Once the JSON client 332 (and possibly the JSON server 338) receives the schemas from the corresponding JSON device, the JSON schemas may be used to generate JSON objects based on the schemas for the purpose of initiating commands, transferring data, and the like. FIG. 6 provides an example 600 of the web browser application 320 issuing a command to the service list component 312C using the exposed specifics of the API 310 as represented in one or more of the schemas received by the JSON client 332. In the example 600, the web application 320 causes the instantiation of a particular object associated with the service list component 312C via a call to a function (new GetService( )) (operation 602).

In response to the request for the object, the web client 331 may then provide the new object (based on a schema received at the JSON client 332) to the web application 320 (operation 603). As indicated in FIG. 3, the web client 331 also facilitates the transfer of JSON objects between the web application 320 and the JSON client 332. As a result, the web client 331 may provide information to the web application 320 concerning the objects, and hence the functionality, that may be provided by the API 310. In another implementation, the web client 331, or its functionality, may reside within the JSON client 332.

Once the web application 320 acquires access to the JSON object (referred to as the GetService object in FIG. 6) associated with retrieving a service from the service list component 312C, the web application 320 updates, or "fills in", the variables and other fields of the JSON object required to provide the necessary input to initiate the desired operation or command at the service list component 312C (operation 604). Thereafter, the web application 320 employs a send( ) function call to transfer the updated GetService object via the web client 331 to the JSON client 332 (operations 606 and 607). In turn, the JSON client 332 transfers the GetService object via another send( ) function call to the JSON server 338 (operation 608). Having received the descriptions of the various aspects of the API 310, the JSON server 338 is capable of determining the intended destination of the received GetService object (i.e., the service list component 312C). As a result, the JSON server 338 submits the GetService object to the service list component 312C via a GetService( ) function call (operation 610). In one implementation, the GetService( ) function call is a "callback" function specified in the GetService object executed by the service list component 312C to process the incoming command or request.

In the GetService function, the service list component 312C performs the requested actions noted in the GetService object. In many circumstances, these actions result in the generation of response data intended for the source of the command (i.e., the web application 320). The service list component 312C may enter that response data into the same GetService object it received, and send the object back to the JSON server 338 (operation 612, via a send( ) function call). The JSON server 338 then forwards the GetService object to the JSON client 332 (operation 614), which in turn passes the object to the web client 331 (operation 615). The web client 331, based on its knowledge of the GetService object, initiates processing of the response data in the object at the browser application 320 by initiating another callback function specified in the GetService object (GetService.callback( )), providing the object itself as input (operation 616).

Oppositely, objects may be received at the JSON server 338 and delivered upon request to one of the STB applications 312 for modification and eventual transfer to the browser application 320 for processing. For example, an event detected or captured at the event component 312D of FIG. 3 may cause that component 312D to initiate a new object based on schema registered by the browser application 320 (as shown in FIG. 4B), update the object, and transfer it to the browser application 320 for processing. The browser application 320 may then populate the object with any associated response data and return the object via the JSON client 332 and the JSON server 338 to the event application 312D.

The example illustrated in FIG. 6 may be considered an example of a "synchronous" command, in which the requested command is complete prior to the service list component 312C returning the associated response data in the GetService object. In other implementations, "asynchronous" commands may be executed, in which the initial service list component 312C response indicates that the command was received. Once the command is actually completed, the service list component 312C may then return the GetService object to the web application 320, this time with response data associated with the actual execution and completion of the command.

Since the web browser 335 of FIG. 3 is employed as the software platform for the web application 320 to provide user interface functionality for the set-top box 200, and a typical HTTP-based sockets connection 339 is employed to communicatively couple the browser application 320 with the API 310, the software running within the web browser 335, including the web application 320, the web client 331, the JSON client 332, and the AJAX module 334, need not reside and execute within the set-top box 200. In other words, the browser 335 and associated software may be deployed on an electronic device separate from the set-top box 200 shown in FIG. 3. Under that scenario, the sockets connection 339 may be employed across an external communication link, such as an Ethernet connection, a WiFi connection, an Internet connection, and the like. Thus, the user interface provided by the web application 320 may be implemented on a device physically remote from the set-top box 200, similar to what is currently available via place-shifting devices, such as the Slingbox® by Sling Media, Inc, but without requiring a separate place-shifting device connected to the set-top box 200. Such a configuration may result in a remote, network-based user interface for the set-top box 200. On the set-top box end of the connection 339, the set-top box 200 may employ the communication interface 206 of FIG. 2 to couple the set-top box 200 to the device containing the web application 320.

In summary, at least some embodiments as described herein for determining or exposing, and subsequently utilizing, an embedded application programming interface in a dynamic manner at runtime provide several benefits. For example, by being able to adapt to any of multiple versions of the application programming interface, a single version of the web application may be employed across a number of versions of the same set-top box, as well as different models of the set-top box. Such a web application may be developed separately from the software residing in the set-top box, given the ubiquitous nature of web browser development environments and tools currently available. Further, given the flexible nature of web browser functionality across different web browsers and associated hardware platforms, reworking of the web application for different computing environments is likely unnecessary. Additionally, since the capabilities of the application programming interface are determined at runtime, synchronization problems between the capability of the web application and the application programming interface are virtually eliminated. Moreover, given the object-oriented nature of the embodiments discussed above, the usual advantages associated with object-oriented programming, such as the explicit association of functions with the data to be operated upon, apply in the implementations described above.

While several embodiments of the invention have been discussed herein, other implementations encompassed by the scope of the invention are possible. For example, while the above embodiments focus on implementations involving a television set-top box, virtually any electronic device employing a processor and software exhibiting an application programming interface may benefit from the principles discussed herein. Further, while the web application discussed above provides functionality for a user interface, any other type of functionality useful in the operation of the electronic device may be programmed in the web application as described earlier. Additionally, aspects of one embodiment disclosed herein may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims and their equivalents.

What is claimed is:
1. A method of dynamically determining and utilizing an application programming interface within a television set-top box, the method comprising:
  determining, at execution time, specific requirements and capabilities of the television set-top box that are embodied in the application programming interface;

receiving, from the application programming interface within the television set-top box, a data structure definition based on the specific requirements and capabilities, wherein the data structure definition describes types and forms of data required for accessing one or more applications of the television set-top box using the application programming interface;

transmitting, via an external communications link of the television set-top box, the data structure definition to a web browser application executing on a remote electronic device, wherein receiving the data structure definition at the web browser application allows the web browser application to generate data structures that conform to the specific requirements and capabilities of the television set-top box, thereby facilitating access to the application programming interface by the remote electronic device without the web browser application being revised, recompiled, or reloaded;

generating, within the television set-top box, a digital video recorder (DVR) data structure for accessing a DVR application of the television set-top box based on the definition;

receiving data at the external communications link of the television set-top box, wherein receiving the data includes receiving a first JavaScript Object Notation object, wherein the data has a type and form suitable for accessing the DVR application of the television set-top box, wherein the data is received from the web browser application of the remote electronic device, and wherein the web browser application of the remote electronic device includes a DVR component that generates the data based on input provided by an end-user of the web browser application for controlling the DVR application of the television set-top box;

updating the DVR data structure with the received data; and transferring the updated DVR data structure to the application programming interface by transferring a second JavaScript Object Notation object, wherein receiving the updated DVR data structure at the application programming interface causes the television set-top box to control the DVR application according to the input provided by the end-user to the web browser application of the remote electronic device.

2. The method of claim 1, further comprising:
after transferring the updated DVR data structure to the application programming interface, transmitting, via the external communications link of the television receiver, response data generated by the DVR application of the television set-top box, wherein the response data is transmitted to the web browser application of the remote electronic device.

3. The method of claim 1, wherein receiving the data structure definition occurs in response to an initialization of the television set-top box.

4. The method of claim 1, further comprising:
receiving a connection message at the external communications link; and
wherein transmitting the data structure definition includes transmitting the data structure definition across a communication connection in response to the connection message.

5. The method of claim 1, wherein the application programming interface comprises an interface for a plurality of applications of the television set-top box.

6. The method of claim 1, wherein the data comprises a command to be executed by the DVR application of the television set-top box.

7. The method of claim 1, wherein the data comprises a request for the DVR application of the television set-top box to report an event.

8. The method of claim 1, wherein data comprises a command for the DVR application of the television set-top box to record a television program received by a tuner of the television set-top box.

9. The method of claim 1, further comprising:
generating, within the television set-top box, an additional data structure for accessing an Electronic Program Guide (EPG) application of the television set-top box based on the definition;
receiving additional data at the external communications link of the television set-top box, wherein the additional data has a type and form suitable for accessing the EPG application of the television set-top box, wherein the additional data is received from the web browser application of the remote electronic device, and wherein the web browser application of the remote electronic device generates the additional data based on additional input provided by an end-user of the web browser application for requesting data from the EPG application of the television set-top box;
updating the EPG data structure with the received data; and
transferring the updated EPG data structure to the application programming interface, wherein receiving the updated EPG data structure at the application programming interface causes the television set-top box to request data from the EPG application according to the additional input provided by the end-user to the web browser application of the remote electronic device.

10. The method of claim 1, wherein receiving the data structure definition includes receiving the data structure definition at a JavaScript Object Notation server of the television set-top box.

11. A method of dynamically facilitating use of an application programming interface within a television set-top box, the method comprising:
determining, at execution time, specific requirements and capabilities of the television set-top box that are embodied in the application programming interface;
receiving, from the application programming interface within the television set-top box, a data structure definition based on the specific requirements and capabilities the application programming interface, wherein the data structure definition describes types and forms of data required for accessing one or more applications of the television set-top box using the application programming interface;
generating an instance of a digital video recorder (DVR) data structure based on the definition, wherein generating includes adapting the DVR data structure to conform to the specific requirements and capabilities of the television set-top box, thereby facilitating access to the application programming interface by a web browser application executing on a remote electronic device without the web browser application being revised, recompiled, or reloaded;
transferring the instance of the DVR data structure to the web browser application executing on the remote electronic device, wherein transferring the instance of the DVR data structure includes transferring a first JavaScript Object Notation object, wherein receiving the instance of the DVR data structure at the web browser application causes the web browser application to update the instance of the DVR data structure with command data generated by a DVR component of the web browser application in response to receipt of input provided by an end-user of the remote electronic device;

receiving the updated instance of the DVR data structure from the web browser application, wherein receiving the updated instance of the DVR data structure includes receiving a second JavaScript Object Notation object, wherein the received updated instance of the DVR data structure comprises the command data generated by the DVR component of the web browser application for the application programming interface to control the DVR application according to the input provided by the end-user; and transferring the updated instance of the DVR data structure to the application programming interface, wherein receiving the updated instance of the DVR data structure at the application programming interface causes the television set-top box to control the DVR application according to the input provided by the end-user of the remote electronic device;

wherein transferring the instance of the DVR data structure to the web browser application occurs over a sockets communication connection between the television set-top box and the remote electronic device.

12. The method of claim 11, wherein receiving the data structure definition includes receiving the data structure definition at a JavaScript Object Notation server of the television set-top box.

13. The method of claim 11, wherein the remote electronic device includes a JavaScript Object Notation client for receiving the instance of the DVR data structure and passing the instance of the DVR data structure to the web browser application.

14. A television set-top box, comprising:
non-transitory data storage configured to store software components comprising instructions; and
a processor configured to execute the instructions of the software components;
wherein the software components comprise:
an application programming interface;
a digital video recorder (DVR) application; and
communication software configured to facilitate communication between the application programming interface and a web browser application that is deployed on a remote electronic device, wherein the web browser application includes a DVR component to enable an end-user to control the DVR application based on input provided by an end-user to the web browser application directly via the remote electronic device;
wherein the application programming interface is configured to register a data structure definition, wherein the data structure definition describes types and forms of data required for accessing one or more applications of the television set-top box using the application programming interface;

wherein the communication software is configured to:
determine, at execution time, specific requirements and capabilities of the television set-top box that are embodied in the application programming interface,
receive the data structure definition,
generate a DVR data structure that conforms to the specific requirements and capabilities based on the data structure definition such that receiving the DVR data structure at the web browser application facilitates access to the application programming interface by the web browser application without the web browser application being revised, recompiled, or reloaded,
transfer an instance of the DVR data structure to the web browser application by transferring a first JavaScript Object Notation object,
receive an updated instance of the DVR data structure from the web browser application by receiving a second JavaScript Object Notation object that includes command data generated by a DVR component of the web browser application in response to the input provided by the end-user, and
transfer the updated instance of the DVR data structure to the application programming interface;
wherein the application programming interface is configured to receive the updated instance of the DVR data structure and to control the DVR application based on the command data.

15. The television set-top box of claim 14, wherein:
the application programming interface is configured to generate response data associated with the command data, to update the instance of the DVR data structure with the response data, and to transfer the instance of the DVR data structure to the communication software; and
the communication software is configured to receive the instance of the DVR data structure from the application programming interface, and to transfer the instance of the DVR data structure to the web browser application for processing.

16. The television set-top box of claim 14, wherein the communication software comprises a communication client and a communication server, wherein the communication client facilitates communication between the web browser application and the communication server, and wherein the communication server facilitates communication between the communication client and the application programming interface.

17. The television set top box of claim 14, further comprising:
a tuner for receiving one or more channels of television programming, wherein the command data comprises a command for the DVR application of the television set-top box to record a television program received by the tuner.

18. The television set top box of claim 14, wherein the communications software includes a JavaScript Object Notation server.

* * * * *